United States Patent [19]
Rudolph

[11] 3,902,516
[45] Sept. 2, 1975

[54] PULMONARY VALVE AND VALVE UNIT THEREFOR

[76] Inventor: Hans Rudolph, 7200 Wyandotte, Kansas City, Mo. 64114

[22] Filed: Jan. 21, 1974

[21] Appl. No.: 434,859

[52] U.S. Cl............. 137/102; 137/512; 137/515.7; 137/525; 251/DIG. 3
[51] Int. Cl........................................ F16k 15/14
[58] Field of Search ........ 137/102, 512, 515.7, 525; 251/DIG. 3

[56] References Cited
UNITED STATES PATENTS

| | | | |
|---|---|---|---|
| 2,395,906 | 3/1946 | Owens | 137/525 X |
| 3,063,461 | 11/1962 | Rudolph | 137/102 |
| 3,119,411 | 1/1964 | Bock et al. | 137/512 X |
| 3,160,329 | 12/1964 | Radic et al. | 137/525 X |

Primary Examiner—Robert G. Nilson
Attorney, Agent, or Firm—Fishburn, Gold & Litman

[57] ABSTRACT

A pulmonary valve for use with respiratory equipment includes an inhalation valve unit and an exhalation valve unit each mounted in a respective portion of a breathing chamber within a hollow body member having a tubular inhalation member and a tubular exhalation member mounted thereon and each communicating with the breathing chamber and spaced from a port in the body member communicating with a tubular mouthpiece member mounted on the body member. The inhalation valve unit and exhalation valve unit each has a tubular member providing a port and having a seat engaged by a disk portion of a valve element sleeved on and retained on the tubular member. The valve element has a sealing flange engaging an anchoring flange of the tubular member and extending outwardly from the valve element to be in sealing engagement between adjacent and separable portions of the pulmonary valve.

7 Claims, 9 Drawing Figures

PATENTED SEP 2 1975 3,902,516

PULMONARY VALVE AND VALVE UNIT THEREFOR

The present invention relates to valves particularly for use in connection with respiratory and similar equipment and more particularly to a pulmonary valve and valve unit therefor wherein the valve element has a sealing flange in overlying relation with an anchoring flange of a tubular member both to be positioned between adjacent and separable portions of a pulmonary valve.

The present invention is an improvement over the structure disclosed in U.S. Pat. No. 3,063,461 issued Nov. 13, 1962, to Hans Rudolph for Valve for Use in Respiratory and Similar Equipment wherein the improvement includes cooperating means on a valve element and on a tubular member of a valve unit to be positioned between adjacent and separable portions of a pulmonary valve to provide a seal therebetween and to hold the valve unit in position in the pulmonary valve.

The principle objects of the present invention are: to provide a pulmonary valve and valve unit therefor which is characterized by low resistance to action thereof and wherein a valve element of the valve unit has a sealing flange in overlying relation with an anchoring flange of a tubular member both to be positioned between adjacent and separable portions of the pulmonary valve; to provide such a valve and valve unit eliminating the need for separate gaskets between adjacent and separable portions of the pulmonary valve; to provide such a valve and valve unit therefor having a minimum space to be cleared upon each operation of the valve element thereof; to provide such a valve unit wherein the components thereof constitute a single assembly that is readily inserted and removed from the body of the pulmonary valve; to provide such a valve unit which is free acting and positively seating wherein a disk portion of the valve element is resiliently urged into seating engagement to close the respective valve unit; to provide a valve unit wherein the components thereof are formed of non-corrosive light weight material and which may be readily sterilized without damage thereto; to provide such a valve unit which is double acting for controlling both inlet and exhaust ports and wherein a valve element has an integral sealing flange and disk portion connected together by integral resilient members; and to provide such a pulmonary valve and valve unit therefor which is economical to manufacture, durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include an exemplary embodiment of the present invention and illustrate various objects and features of the pulmonary valve and valve unit therefor.

Figure 1:
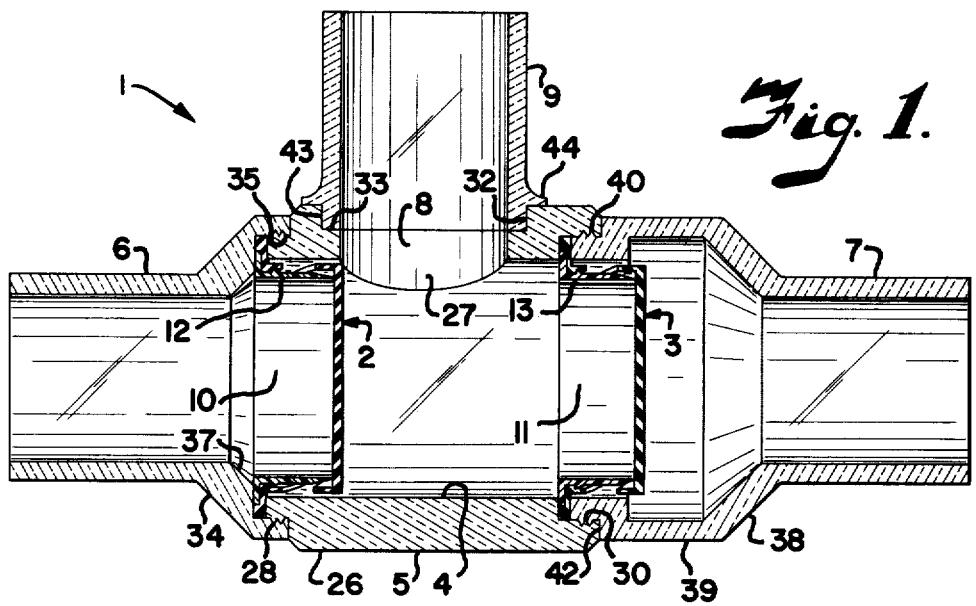
FIG. 1 is a longitudinal sectional view of a pulmonary valve with valve units therein all embodying features of the present invention.
Figure 2:
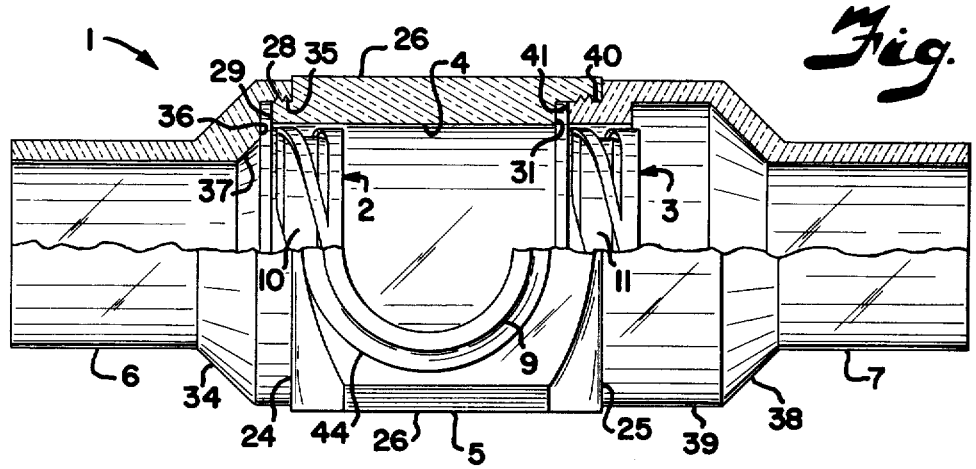
FIG. 2 is a top plan view of the pulmonary valve with portions broken away to show the component parts of the valve and valve units therein.
Figure 4:
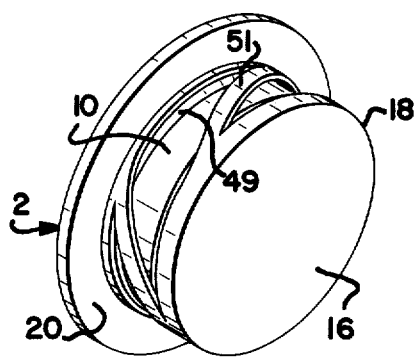
FIG. 4 is an enlarged perspective of an assembled valve unit for use in the pulmonary valve.
Figure 5:
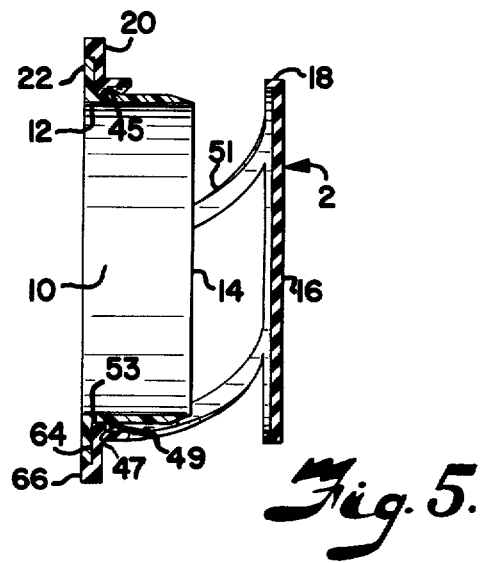
FIG. 5 is an enlarged longitudinal sectional view of the assembled inhalation valve unit with a valve disk in an unseated position.
Figure 6:
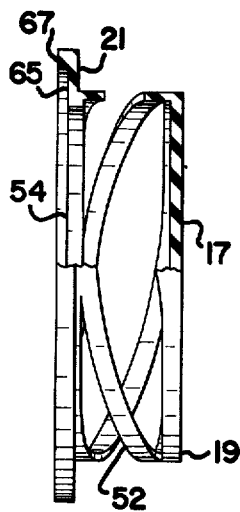
FIG. 6 is an enlarged side elevational view of the valve element of the exhalation valve unit with portions broken away.
Figure 3:
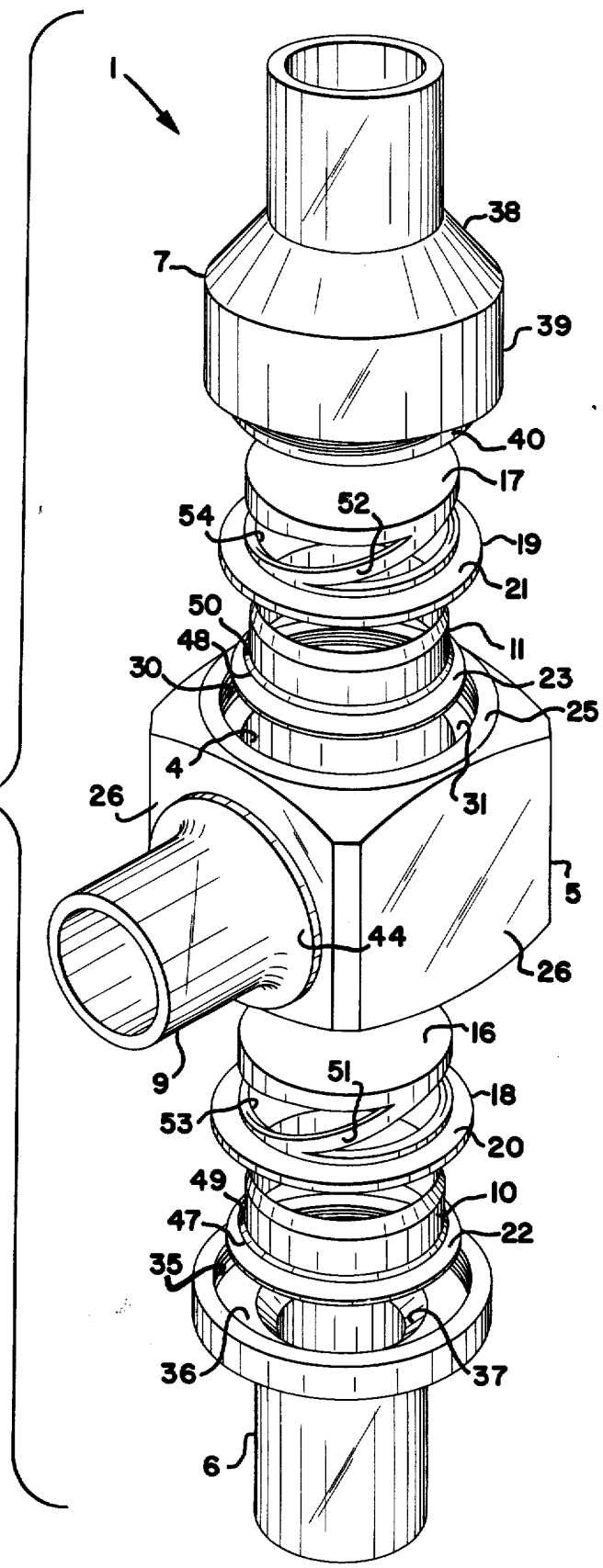
FIG. 3 is an exploded perspective view with portions broken away.
Figure 7:
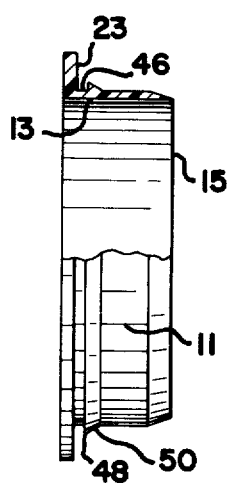
FIG. 7 is an enlarged side elevational view of a tubular member of the exhalation valve unit with portions broken away.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiments of the present invention, the reference numeral 1 generally designates a pulmonary valve for use with respiratory equipment (not shown). The pulmonary valve 1 includes an inhalation valve unit 2 and an exhalation valve unit 3 each mounted in a respective portion of a breathing chamber 4 within a hollow body member 5 having a tubular inhalation member 6 and a tubular exhalation member 7 mounted thereon and each communicating with the breathing chamber 4 and spaced from a port 8 in the body member 5 communicating with a tubular mouthpiece member 9 mounted on the body member 5. The inhalation valve unit 2 and the exhalation valve unit 3 have tubular members 10 and 11 respectively providing ports 12 and 13 which have seats 14 and 15 respectively engaged by disk portions 16 and 17 of respective valve elements 18 and 19 sleeved on and retained on the tubular members 10 and 11 respectively. The valve elements 18 and 19 have sealing flanges 20 and 21 engaging anchoring flanges 22 and 23 respectively of the tubular members 10 and 11. The sealing flanges 20 and 21 each have portions which extend outwardly from the respective valve elements 18 and 19 to be in sealing engagement between adjacent and separable portions of the pulmonary valve 1.

The body member 5 may be of any desired shape and constructed of any suitable material. However, preferably the body member 5 is formed of transparent plastic material preferably of the heat resistant type. In the illustrated embodiment, the body member 5 is a quadrilateral prism provided with generally flat opposite ends 24 and 25 and flat sides 26. The body member 5 has a longitudinal cylindrical bore providing and defining the breathing chamber 4. The bore through the body member 5 is intersected by a transverse bore 27 to provide a breathing port 8 in communication with the breathing chamber 4.

One of the ends of the body member 5 has the inhalation member 6 mounted thereon. In the illustrated structure, the end 24 of the body member 5 has a threaded neck 28 terminating in an end surface 29 adapted to be engaged by the sealing flange 20 of the inhalation valve unit 2. The surface of the inhalation end 24 of the body member 5 provides a shoulder to be engaged by one end of the inhalation member 6, as later described.

The other or exhalation end 25 of the body member 5 has an internally threaded counter bore 30 whereby the surface of the exhalation end 25 of the body member 5 provides a shoulder to be engaged by the exhalation member 7, as later described. A shoulder 31 extending between the threaded counterbore 30 and the bore in the body member 5 defining the breathing chamber 4 is adapted to be engaged by the sealing flange 21 and the anchoring flange 23 of the exhalation valve unit 3, as later described.

The mouthpiece member 9 may be mounted on the body member 5 in any desired manner and may be secured thereto, as by glue, or separable, as by threads. In the illustrated embodiment, the body member 5 has a counterbore 32 in the side 26 having the transverse bore 27 therein. The counterbore 32 provides a shoulder 33 to be engaged by an end of the mouthpiece member 9, as later described.

The illustrated inhalation member 6 is a tubular member having an outwardly enlarging portion 34 terminating in an internally threaded mounting flange 35 which as an end surface engageable with the inhalation end 24 of the body member 5.

The enlarged portion 34 of the inhalation member 6 has a shoulder 36 adapted to be in engagement with the anchoring flange 22 and the sealing flange 20 of the inhalation valve unit 2. The shoulder 36 is in facing relation with the end surface 29 of the threaded neck 28 when the mounting flange 35 is mounted on the threaded neck 28.

The interior surface of the inhalation member 6 includes an outwardly inclined surface 37 extending between the shoulder 36 and the surface defining the bore of the inhalation member 6. The intersection of the inclined surface 37 and the shoulder 36 is aligned with the surface defining the bore or port 12 through the tubular member 10 thereby providing smooth inhalation flow through the inhalation member 6 into the pulmonary valve 1.

The illustrated exhalation member 7 is a tubular member having an outwardly enlarging portion 38 positioned intermediate the ends thereof and providing an enlarged end portion 39 which terminates in a threaded neck 40. The threaded neck 40 on the end of the exhalation member 7 terminates in an end surface 41 which is in facing relation with the shoulder 31 in the exhalation end 7 of the body member 5. The end surface 41 and the shoulder 31 are adapted to have the sealing flange 21 and the anchoring flange 23 of the exhalation valve unit 3 positioned therebetween. The threaded neck 40 of the exhalation member 7 terminates at a shoulder 42 adapted to engage the exhalation end 25 of the body member 5.

The illustrated mouthpiece member 9 is a tubular member having a neck portion 43 adapted to be received in and secured in the counterbore 32 with the bore of the mouthpiece member 9 being aligned with the transverse bore 27. The mouthpiece member 9 has an outwardly extending flange 44 adapted to engage an exterior surface of the side 26 of the body member 5 adjacent the counterbore 32. A suitable glue or adhesive is placed on surfaces of the mouthpiece member 9 which are in engagement with respective surfaces of the body member 5 thereby securing the mouthpiece member 9 in position on the body member 5.

The illustrated tubular members 10 and 11 for the inhalation valve unit 2 and the exhalation valve unit 3 respectively are of like construction and each has an exterior diameter which is smaller than the interior diameter of the bore defining the breathing chamber 4 of the body member 5 to provide space between the tubular members 10 and 11 and the body member 5 to accommodate the valve elements 18 and 19 respectively. The anchoring flanges 22 and 23 of the tubular members 10 and 11 respectively are positioned at the end opposite the seats 14 and 15.

The tubular members 10 and 11 have beveled ends cooperating with the respective bore therethrough to form narrow or edge seats 14 and 15 to be engaged by the disk portions 16 and 17 respectively. In the illustrated structure, the seats are substantially V-shaped. The exterior of the tubular members 10 and 11 each have wall means defining annular grooves or recesses 45 and 46 in the exterior surface of the tubular members 10 and 11 respectively and positioned intermediate the ends thereof. The wall means defining the grooves or recesses 45 and 46 includes annular ribs 47 and 48 extending outwardly from the tubular members 10 and 11 in facing relation with the anchoring flanges 22 and 23 respectively. The annular ribs 47 and 48 have tapering faces 49 and 50 joining with the respective exterior surface of the tubular members 10 and 11 for facilitating mounting of the valve elements 18 and 19 respectively thereon.

The valve elements 18 and 19 are also of like construction having the disk portions 16 and 17 respectively arranged to have one face thereof seat on the seats 14 and 15 of the tubular members 10 and 11 respectively. The disk portions 16 and 17 are of larger diameter than the outer diameter of the tubular members 10 and 11 respectively to permit resilient members 51 and 52 to be sleeved on the tubular members 10 and 11. The resilient members 51 and 52 are freely and loosely slidable over the tubular members 10 and 11 in order to support the disk portions 16 and 17 coaxially with the seats 14 and 15 and in parallel relation with the plane of the seat edges.

The resilient members 51 and 52 comprise a plurality of circumferentially spaced members each having respective opposite ends thereof integral with the respective disk portion and with the respective sealing flange at the other end of the valve element. The resilient members 51 and 52 each extend in a spiral path between the respective disk portion and the sealing flange at the other end of the respective valve element.

The ends of the resilient members 51 and 52 opposite the disk portions 16 and 17 respectively are connected to means defining ring portions 53 and 54 respectively adapted to be received in the grooves or recesses 45 and 46 on the exterior surface of the tubular members 10 and 11 respectively.

The resilient members 51 and 52 are preferably of rectangular cross section and when the disk portions 16 and 17 engage the seats 14 and 15 with the ring portions 53 and 54 engaged in the grooves 45 and 46, the resilient members 51 and 52 are slightly spaced apart and provide sufficient tension to hold the respective disk portion in seated position on the seats 14 and 15 respectively. The action of the resilient members 51 and 52 is such that when a higher pressure exists on the seating side of the respective disk portion, the disk portion will move away from the seat to allow the pressure to pass between the respective resilient members 51 and 52.

The tension in the resilient members 51 and 52 is determined by the character of the material from which the valve elements 18 and 19 are formed and by the cross sectional area thereof. A satisfactory material for making the valve elements 18 and 19 is one of the heat resistant plastics, such as silicone rubber.

Figure 8:
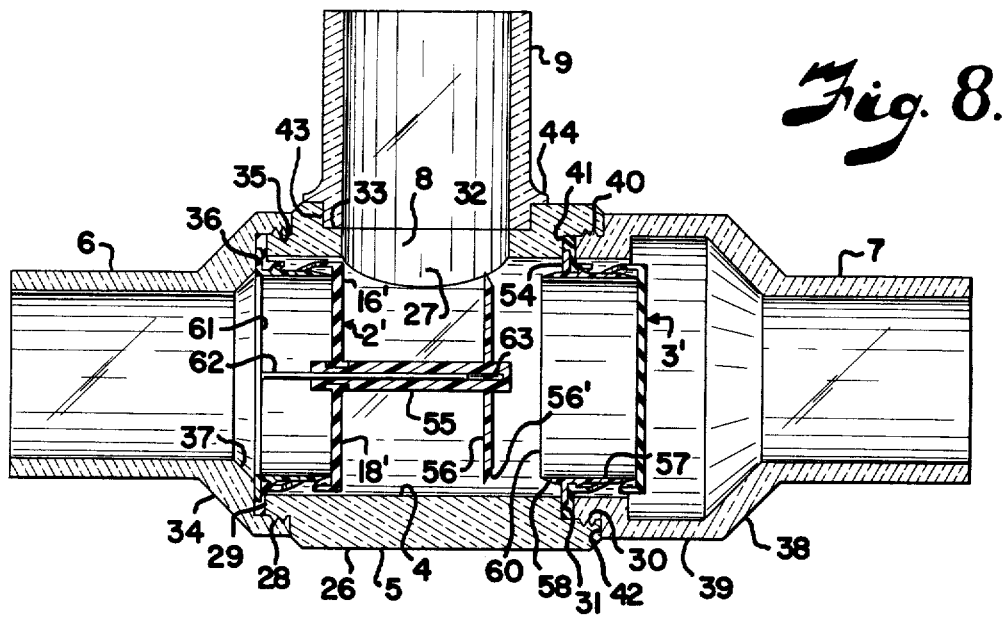
FIG. 8 is a longitudinal sectional view of a modified form of the pulmonary valve having a double acting valve element with the valve element being shown in closed position.
Figure 9:
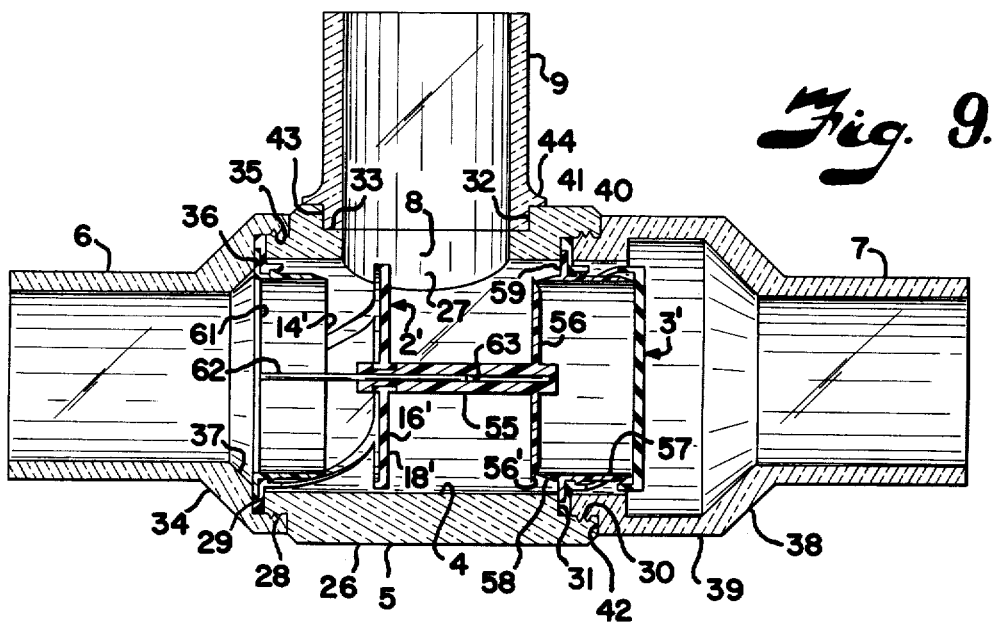
FIG. 9 is a similar view of the double acting valve with the valve unit being open on the pressure side and closed on the exhaust side.

A valve modification shown in FIGS. 8 and 9 is of substantially the same construction as the form just described with the exception that the valve element 18' of the inhalation valve unit 2' is provided with an axial stem 55 supporting a diaphragm 56 and a tubular member 57 of the exhalation valve unit 3' has a tubular end portion 58 extending from an anchoring flange 59 toward the interior of the breathing chamber. The tubular end portion 58 has a seat 60 thereon which is substantially similar to the seats 14 and 15. The peripheral edge of the tubular end portion 58 is beveled to provide a V-shaped for the seat 60 to be engaged by the diaphragm 56. The diaphragm 56 has a beveled seat surface 56' at the periphery which engages the seat 60 when in closed position. The beveled surface 56' reduces possibilities of sticking and facilitates opening for flow to the tubular member 57.

In this valve, the added weight of the stem 55 and the diaphragm 56 may require a supplementary support. A spider 61 is positioned in the inlet end of the inhalation valve unit 2' and has a guide pin 62 adapted to extend into a bore 63 of the axial stem 55. The guide pin 62 slidably supports the diaphragm 56 and the respective disk portion 16' in a position substantially concentric with the seat 60 and the seat 14' on the inhalation valve unit 2'.

The valve units illustrated in FIGS. 1 to 7 inclusive and in FIGS. 8 and 9 are easily assembled. Assembly will be described for the valve units illustrated in FIGS. 1 to 7 and assembly for the valve units shown in FIGS. 8 and 9 is substantially similar. The valve units 2 and 3 are assembled by sliding the ring portions 53 and 54 over the inclined or tapering faces 49 and 50 of the respective annular ribs 47 and 48. The ring portions 53 and 54 are formed of resilient material thereby expanding sufficiently to slip over the annular ribs 47 and 48 and snap into the grooves or recesses 45 and 46 respectively. The valve elements 18 and 19 are thereby anchored in position with first portion 64 and 65 of the sealing flanges 20 and 21 respectively in overlying engagement with the anchoring flanges 22 and 23 of the tubular members 10 and 11 respectively. The sealing flanges 20 and 21 have second portions 66 and 67 respectively extending outwardly from the first portions 64 and 65 to be in sealing engagement between adjacent and separable portions of the pulmonary valve 1. The second portions 66 and 67 of the sealing flanges 20 and 21 each have a greater thickness then the respective anchoring flanges 22 and 23. The resilient members 51 and 52 extend between the disk portions 16 and 17 and the ring portions 53 and 54 respectively and the resilient members 51 and 52 provide sufficient support to retain the disk portions 16 and 17 concentric with the axis of the tubular members 10 and 11 respectively in which position, the resilient members 51 and 52 are loosely encircling the tubular members 10 and 11.

With the valve units 2 and 3 assembled as previously described in inhalation valve unit 2 is positioned in the breathing chamber 4 with the first portion 64 and the second portion 66 of the sealing flange 20 in engagement with the end surface 29 of the threaded neck 28. The inhalation member 6 is then mounted on the body member 5 through the threaded engagement between the mounting flange 35 and the threaded neck 28 to move the shoulder 36 into engagement with the anchoring flange 22 and the second portion 66 of the sealing flange 20 thereby retaining the inhalation valve unig 2 in position. The anchoring flange 23 and the second portion 67 of the sealing flange 21 are positioned in engagement with the shoulder 31 and the exhalation member 7 is mounted on the body member 5 by positioning the threaded neck 40 in the counterbore 30 and turning same until the end surface 41 of the neck 40 is in engagement with the sealing flange 21 and the shoulder 42 is in engagement with the exhalation end surface 25 thereby retaining the exhalation valve unit 3 in position. The mouthpiece member 9 is mounted on the body member 5 by adhesive as previously described.

The pulmonary valve 1 may be used for various purposes, for example, to administer oxygen, in which case the inhalation member 6 would be connected with the oxygen supply and the mouthpiece member 9 is connected with a mask or other means by which the oxygen is administered to the recipient. The exhalation member 7 may be connected to various testing apparatus or it may exhaust to the atmosphere.

Inhalation by the recipient will create a negative pressure in the breathing chamber 4 and act on the disk portion 16 of the inhalation valve unit 2 so that the valve element 18 will open. Unseating of the disk portion 16 will expand the resilient members 51 so that oxygen will pass through the tubular member 10 and through the spaces between the resilient members 51 and through the mouthpiece member 9. On exhalation a positive pressure will be created in the breathing chamber 4 and on the disk portion 17 of the exhalation valve unit 3 to cause unseating of the disk portion 17 permitting seating of the disk portion 16. At the end of the exhalation, the pressure will drop between the valve units 2 and 3 and the resilient members 52 of the exhalation valve unit 3 will seat the disk portion 17 on the seat 15. On the next inhalation, the resilient members 52 will hold the disc portion 17 closed or seated but the disc portion 16 of the inhalation valve unit 2 will open, as previously described. In a valve constructed as illustrated and described, it is obvious that there will be relatively small dead space between the valves and that the space will be substantially cleared on each cycle of operation.

The forms of the invention shown in FIGS. 8 and 9 is for a different use, in that the inhalation valve unit 2' is equipped with the diaphragm 56 and the exhalation valve unit 3' is equipped with the tubular end portion 58 and the seat 60 thereon whereby the air or gas administered through the inhalation member 6 is all diverted through the mouthpiece member 9 since the opening of the disk portion 16' results in seating of the seat surface 56' of diaphragm 56 to close the exhaust or exhalation valve unit 3'. For example, this type of valve may be used in establishing artificial respiration, in which case the mouthpiece member 9 will be connected with a face mask or the like and the inhalation member 6 may be used for supplying air. The exhalation member 7 may simply form a duct for the exhaust air expelled from the lungs of the recipient. On discharging air into the valve through the inhalation member 6, the disk portion of the inhalation valve unit 2' unseats and the seat surface of diaphragm 56 seats to cover the exhaust port so that all of the air is discharged through the mouthpiece member 9 for inflating the lungs of the recipient. On suspension of the pressure in the inhalation member 6, the resilient members 51 will seat the disk portion 16 of the inlet or inhalation valve unit 2' and thereby unseat the seat surface of diaphragm 56 relative to the seat 60, whereupon the air is expelled or exhausted through the exhalation member 7. The pressure of the discharge is sufficient to unseat the disk portion 17 of the exhalation valve unit 3' and provide for exhaust thereof through the resilient members 52 and through the exhalation member 7.

It is to be understood that while I have illustrated and described certain forms of my invention, it is not to be limited to these specific forms or arrangement of parts herein described and shown.

I claim:

1. A valve unit for use in a pulmonary valve, said valve unit comprising:
   a. a tubular member providing a port and having a seat on one end thereof and surrounding said port;
   b. means on said tubular member adjacent the other end thereof for anchoring same at a selected location in a pulmonary valve;
   c. a valve element sleeved on said tubular member and having a disk portion at one end thereof for engaging said seat to close said port;
   cooperating means on said tubular member and on said valve element adjacent the other end thereof for retaining said valve element on said tubular member;
   e. spaced resilient means integral with the extending in a spiral path between said disk portion and the other end of said valve element for yieldably retaining said disk portion in engagement with said seat and for permitting flow therebetween upon unseating of said disk portion;
   f. a sealing flange extending from the other end of said valve element and engaging said anchoring means on said tubular member extending outwardly from said valve element to be in sealed engagement between adjacent and separable portions of the pulmonary valve;
   g. said resilient means includes a plurality of circumferentially spaced resilient members each having respective opposite ends thereof integral with said disk portion and with said sealing flange at the other end of said valve element.

2. A valve unit as set forth in claim 1 wherein:
   a. said anchoring means on said tubular member comprises an anchoring flange extending outwardly from the other end of said tubular member;
   b. said valve element has a ring portion at said other end thereof and said sealing flange extends outwardly from said ring portion and is in overlying engagement with said anchoring flange of said tubular member; and
   c. said sealing flange extends outwardly beyond said anchoring flange.

3. A valve unit as set forth in claim 2 wherein said cooperating means for retaining said valve element on said tubular member comprises:
   a. an annular rib on said tubular member and cooperating with said anchoring flange for forming a recess therebetween in the exterior surface of said tubular member intermediate the ends thereof;
   b. said ring portion of said valve element having means engaged in said recess in the exterior surface of said tubular member.

4. A valve unit as set forth in claim 3 wherein:
   a. said sealing flange as a first portion in overlying engagement with said anchoring flange of said tubular member;
   b. said anchoring flange has a peripheral surface;
   c. said sealing flange has a second portion extending outwardly from said first portion and engaging said peripheral surface of the anchoring flange to be in sealing engagement between adjacent and separable portions of the pulmonary valve;
   d. said second portion of said sealing flange has a thickness greater than a thickness of said anchoring flange.

5. A pulmonary valve comprising:
   a. a hollow body member providing a breathing chamber therein;
   b. a tubular inhalation member having one end mounted on said body member and communicating with the breathing chamber in said body member;
   c. a tubular exhalation member having one end mounted on said body member and communicating with the breathing chamber in said body member;
   d. a tubular mouthpiece member having one end mounted on said body member and communicating with the breathing chamber in said body member; and
   e. an inhalation valve unit and an exhalation valve unit mounted in the breathing chamber in said body member, said valve units each comprising:
      1. a tubular member providing a port and having a seat on one end thereof and surrounding said port;
      2. means on said tubular member adjacent the other end thereof for anchoring same at a selected location in a pulmonary valve, said anchoring means each being positioned between said body member and the one end of a respective one of said inhalation member and said exhalation member;
      3. a valve element having a ring portion at one end thereof sleeved on said tubular member and having a disk portion at the other end thereof for engaging said seat to close said port;
      4. cooperating means on said tubular member and on said valve element ring portion for retaining said valve element on said tubular member;
      5. spaced resilient means integral with and extending in a spiral path between said disk portion and the one end of said valve element for yieldably retaining said disk portion in engagement with said seat and for permitting flow therebetween upon unseating of said disk portion; and
      6. a sealing flange extending from said ring portion of said valve element and engaging said anchoring means on said tubular member and extending outwardly from said valve element to be in sealing engagement between said body member and the one end of a respective one of said inhalation member and said exhalation member;

7. said resilient means includes a plurality of circumferentially spaced resilient members each having respective opposite ends thereof integral with said disk portion and with said ring portion at the one end of said valve element.

6. A pulmonary valve as set forth in claim 5 wherein:
a. said anchoring means on said tubular member comprises an anchoring flange extending outwardly from the other end of said tubular member;
b. said anchoring flange has peripheral surface; and
c. said sealing flange has a first portion in overlying engagement with said anchoring flange of said tubular member and a second portion extending outwardly therefrom and engaging said peripheral surface of the anchoring flange to be in sealing engagement between said body member and the one end of a respective one of said inhalation member and said exhalation member;
d. said second portion of said sealing flange has a thickness greater than a thickness of said anchoring flange.

7. A pulmonary valve as set forth in claim 6 wherein:
a. said tubular member for said exhalation valve unit has a tubular end portion extending from said anchoring flange and having a seat thereon;
b. said valve element for said inhalation valve unit includes a diaphragm spaced from said disk portion thereof for seating on the seat on the tubular end portion of said tubular member for said exhalation valve unit upon unseating of said disk portion from the seat on said tubular member for said inhalation valve unit;
c. said valve element for said inhalation valve unit includes means on said disk portion thereof for supporting said diaphragm; and
d. said means for supporting said diaphragm includes means mounted on said tubular member for guiding said diaphragm during movement toward and away from the seat on the tubular end portion of said tubular member for said exhalation valve unit.

* * * * *